US012477295B2

(12) United States Patent
Tanno

(10) Patent No.: US 12,477,295 B2
(45) Date of Patent: Nov. 18, 2025

(54) SOUND PROCESSING DEVICE, SOUND SYSTEM, AND SOUND PROCESSING METHOD

(71) Applicant: ALPS ALPINE CO., LTD., Tokyo (JP)

(72) Inventor: Keita Tanno, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 160 days.

(21) Appl. No.: 18/431,325

(22) Filed: Feb. 2, 2024

(65) Prior Publication Data

US 2024/0267694 A1 Aug. 8, 2024

(30) Foreign Application Priority Data

Feb. 6, 2023 (JP) ................................ 2023-016401

(51) Int. Cl.
*H04S 7/00* (2006.01)

(52) U.S. Cl.
CPC .......... *H04S 7/303* (2013.01); *H04S 2400/01* (2013.01)

(58) Field of Classification Search
CPC ..... H04R 5/023; H04R 2499/13; H04S 5/005; H04S 7/302
See application file for complete search history.

(56) References Cited

U.S. PATENT DOCUMENTS

| | | | |
|---|---|---|---|
| 9,998,846 B2 | 6/2018 | Nakano | |
| 2023/0012320 A1 | 1/2023 | Harada | |
| 2023/0042762 A1* | 2/2023 | Franco | H04S 7/303 |

FOREIGN PATENT DOCUMENTS

| | | |
|---|---|---|
| JP | 2003-111200 | 4/2003 |
| JP | 2018139353 A * | 9/2018 |
| WO | WO 2015/166814 A1 | 11/2015 |

OTHER PUBLICATIONS

Extended European Search Report in European application No. 24154741.3 dated Jun. 11, 2024, 5 pages.

* cited by examiner

*Primary Examiner* — James K Mooney
(74) *Attorney, Agent, or Firm* — Crowell & Moring LLP

(57) ABSTRACT

The sound processing device includes the first processor that performs the trans-aural process on the signals corresponding to the plurality of headrest speakers so that a tentative sound image is localized by the plurality of headrest speakers at a tentative position within a region which does not include the front side of the head but includes the left and right sides and the back side of the head, and the second processor that performs the amplitude panning on signals corresponding to the front speakers and a signal processed by the first processor so that a final sound image is localized at a final position between a tentative sound image and the front speakers in accordance with a difference in volume between the tentative sound image and the front speakers.

9 Claims, 9 Drawing Sheets

SOUND PROCESSING DEVICE, SOUND SYSTEM, AND SOUND PROCESSING METHOD

RELATED APPLICATION

The present application claims priority to Japanese Patent Application Number 2023-016401, filed Feb. 6, 2023, the entirety of which is hereby incorporated by reference.

BACKGROUND

1. Field of the Disclosure

The present disclosure relates to a sound processing device, a sound system, and a sound processing method, and is particularly suitable for use as a sound processing device having a function of processing signals to be supplied to headrest speakers, a sound system including the sound processing device, and a sound processing method employed in the sound processing device.

2. Description of the Related Art

In general, the following technique has been used. That is, a trans-aural process is applied to signals supplied to speakers (i.e., not headphones or earphones) that emit sound from a position distant from a head of a listener, and a virtual sound image is localized at a desired position distant from the listener's head (refer to, for example, International Publication No. 2015/166814). According to the technique of International Publication No. 2015/166814, the listener can hear sound as if the sound were emitted from a localized sound image. The technique of localizing the sound image disclosed in International Publication No. 2015/166814 has also been used to be applied to a system with headrest speakers installed in a headrest portion of a seat (refer to, for example, JP 2003-111200 A). According to the technique of JP 2003-111200 A, a virtual sound image is localized on a front side of a head of a listener seated in a seat, and the listener can listen to sound as if the sound were being emitted from a speaker located on the front side of the listener while seated in the seat.

As for a system, such as the one described in JP 2003-111200 A, which uses headrest speakers to allow a listener to hear sound, novel methods are constantly sought to improve the sense of presence (sensation that sound is being emitted from a localized sound image) that the listener feels while the headrest speakers are installed in a headrest portion of a seat, and therefore, novel techniques for localizing a sound image have been required to realize such novel methods.

SUMMARY

The present disclosure is made to address such a problem, and an object is to provide a novel technique of localizing a sound image that contributes to realize a novel method for allowing a listener to hear sound while the sense of presence is improved, in a system that allows the listener to hear sound using head speakers.

Accordingly, some implementations of a sound processing device according to the present disclosure have the following configuration. A sound processing device processes signals to be supplied to a plurality of headrest speakers installed in a headrest portion of a seat and one or more front speakers that are installed in front of a head of a listener when the listener is seated in the seat and facing forward and that emit sound toward the head. The sound processing device includes the first processor that performs the trans-aural process on the signals corresponding to the plurality of headrest speakers so that a tentative sound image is localized by the plurality of headrest speakers at a tentative position within a region which does not include the front side of the head but includes the left and right sides and the back side of the head, and the second processor that performs the amplitude panning on signals corresponding to the front speakers and a signal processed by the first processor so that a final sound image is localized at a final position between a tentative sound image and the front speakers in accordance with a difference in volume between the tentative sound image and the front speakers.

According to some implementations of the present disclosure configured as described above, localization of a tentative sound image in "a region that does not include a front side relative to a head but includes left, right, and back sides relative to the head" by a trans-aural process performed on a signal corresponding to a headrest speaker and localization of a final sound image using the tentative sound image (virtual sound image) and an amplitude panning process performed on a signal corresponding to a front speaker (actual speaker) are performed. Specifically, in the present disclosure, not only headrest speakers but also front speakers are used, and furthermore, taking advantage of the fact that front speakers are used, a final sound image is localized through a two-step process including the localization of a tentative sound image described above and the subsequent localization of the final sound image. This technique is a novel technique for sound image localization that is distinct from existing techniques of localizing a virtual sound image on the front side of the head by the trans-aural process performed on signals corresponding to the headrest speakers. In particular, according to some implementations of the present disclosure, since the front speakers are used together with the headrest speakers to achieve sound image localization, sound from the headrest speakers is supplemented by sound from the front speakers, which improves the sense of presence felt by the listener, when compared to general techniques that use only the headrest speakers to localize the sound image. Specifically, the present disclosure provides a novel technique for sound image localization that contributes to realization of a novel method for allowing a listener to listen sound with improved sense of presence, in the system that allows the listener to listen sound using head speakers.

DETAILED DESCRIPTION

Figure 1:
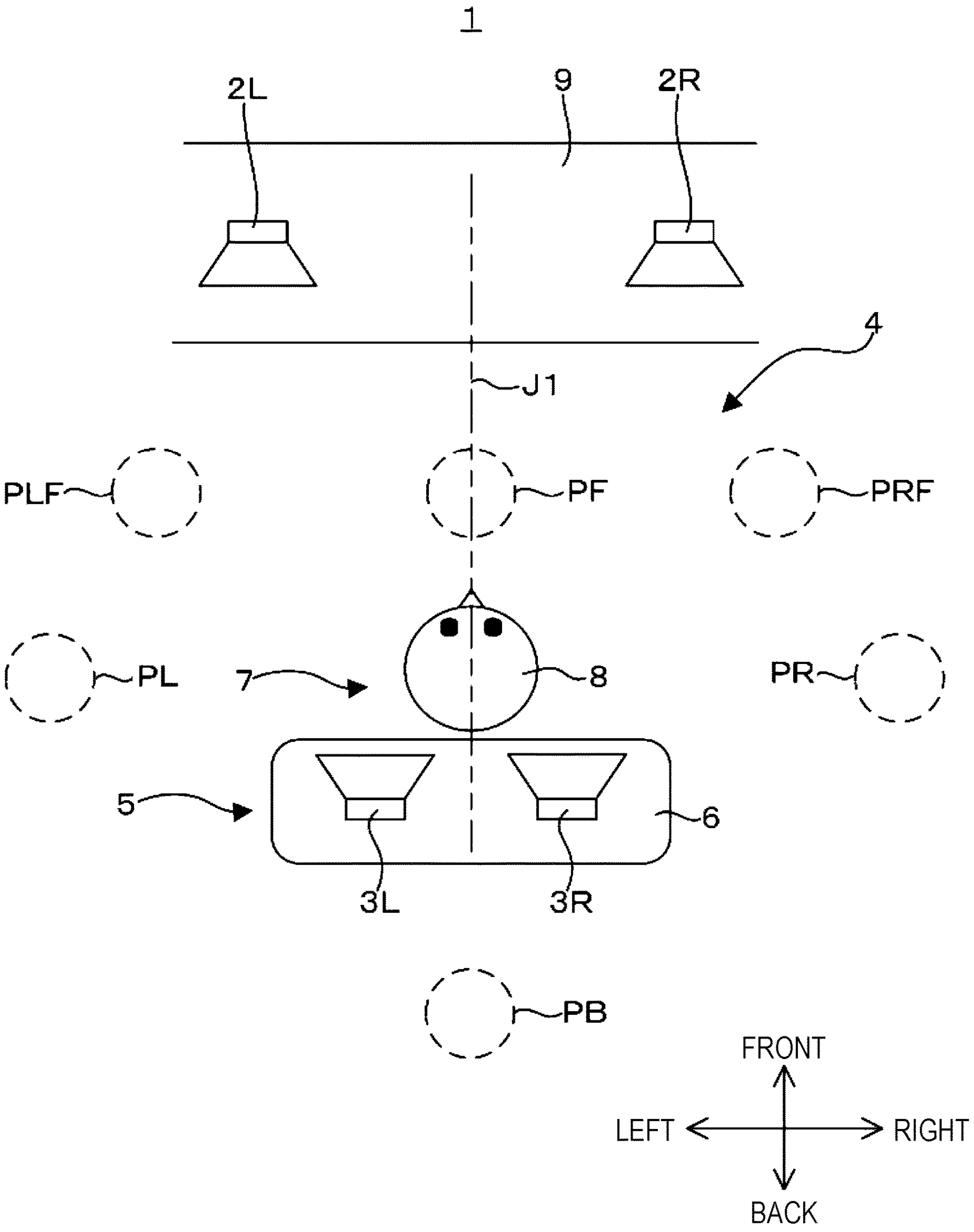
FIG. 1 is a diagram illustrating a state of installed speakers included in a sound system according to an embodiment of the present disclosure.

An embodiment of the present disclosure will be described hereinafter with reference to the accompanying drawings. FIG. 1 is a simplified view of a left front speaker 2L, a right front speaker 2R, a left headrest speaker 3L, and a right headrest speaker 3R, which are included in a sound system 1 of this embodiment, arranged in a vehicle cabin 4 in a manner suitable for explanation. In FIG. 1, a head 8 of a driver 7 (listener) seated on a seat 5 (driver's seat) and facing forward, is schematically illustrated together with a headrest portion 6 of the seat 5. In a situation of FIG. 1, a front side relative to the head 8 of the driver 7 coincides with a front side of a vehicle (a direction in which the vehicle is moving forward).

In the following description, as illustrated in FIG. 1, a direction straight ahead of the front relative to the head 8 of the driver 7 facing the front (the direction in which the vehicle is moving forward) is referred to as "front side" or "front," and an opposite direction of the front side is referred to as "back side" or "back". Furthermore, a direction toward the left when facing the front is referred to as "left side" or "left", and a direction toward the right when facing the front is referred to as "right side" or "right". Moreover, a vertically upward direction is referred to as "upward" and a vertically downward direction is referred to as "downward". In addition, unless otherwise explained, an expression "head 8" means the head 8 facing front (i.e., the head 8 in the state illustrated in FIG. 1). In the following description, a combination of the left front speaker 2L and the right front speaker 2R may be referred to as "front speakers 2L and 2R" and a combination of the left headrest speaker 3L and the right headrest speaker 3R as "headrest speakers 3L and 3R". The front speakers 2L and 2R and the headrest speakers 3L and 3R may be collectively referred to as "speakers SP".

As illustrated in FIG. 1, the sound system 1 according to this embodiment includes the front speakers 2L and 2R and the headrest speakers 3L and 3R. The headrest speakers 3L and 3R are a pair of speakers installed in the headrest portion 6 of the seat 5. Note that the headrest speakers 3L and 3R are installed inside the headrest portion 6 and are not exposed to the outside, but for convenience of explanation, the headrest speakers 3L and 3R are drawn in solid lines in FIG. 1. An axis J1 in FIG. 1 indicates a position of the head 8 in a lateral direction. As represented by the positional relationship between the axis J1 and the headrest speakers 3L and 3R, the left headrest speaker 3L is positioned to the left of the head 8 in the lateral direction and the right headrest speaker 3R is positioned to the right of the head 8 in the lateral direction.

The front speakers 2L and 2R are a pair of speakers installed in the front side relative to the head 8 of the driver 7, spaced apart in the lateral direction. The front speakers 2L and 2R emit sound toward the head 8. The front speakers 2L and 2R are properly fixed to a top of a dashboard 9. As indicated by the positional relationship between the axis J1 and the front speakers 2L and 2R, the left front speaker 2L is positioned to the left of the head 8 in the lateral direction, and the right front speaker 2R is positioned to the right of the head 8 in the lateral direction. A separation distance between the left front speaker 2L and the right front speaker 2R is greater than a separation distance between the left headrest speaker 3L and the right headrest speaker 3R.

Figure 2:
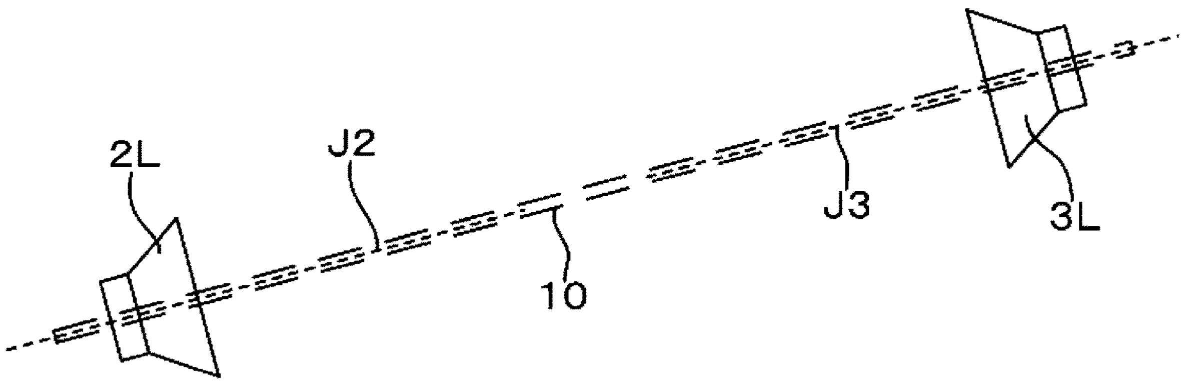
FIG. 2 is a left side view of one of front speakers and one of headrest speakers.

FIG. 2 is a simplified schematic view of the left front speaker 2L and the left headrest speaker 3L from the left side to illustrate a side view of the front speakers 2L and 2R and the headrest speakers 3L and 3R. The headrest speakers 3L and 3R are located in positions higher than the front speakers 2L and 2R. As illustrated in FIG. 2, the front speakers 2L and 2R are tilted upward and the headrest speakers 3L and 3R are tilted downward so that virtual center axes J2 of the front speakers 2L and 2R (only the center axis J2 of the left front speaker 2L is illustrated in FIG. 2) and virtual center axes J3 of the headrest speakers 3L and 3R (only the center axis J3 of the left headrest speaker 3L is illustrated in FIG. 2) are on the same virtual plane 10.

Next, functions of the sound system 1 according to this embodiment will be described. Referring to FIG. 1, the sound system 1 has a function to selectively localize a virtual sound image at six positions: a left side position PL, a right side position PR, a left front position PLF, a right front position PRF, a front position PF, and a back position PB, and to emit sound related to alerts (hereinafter referred to as "alert-related sound"). The left side position PL indicates a position on a left side relative to the head 8 and the right side position PR indicates a position on a right side relative to the head 8. The front position PF indicates a position in front of the head 8 and the back position PB indicates a position on a back side relative to the head 8. The left front position PLF indicates a position on a left front side (diagonally left front) relative to the head 8. In particular, the left front position PLF is located between the left front speaker 2L and the left side position PL (=left side tentative position VL, described below). The right front position PRF indicates a position on a right front side (diagonally right front) relative to the head 8. In particular, the right front position PRF is located between the right front speaker 2R and the right side position PR (=right side tentative position VR, described below).

Hereafter, when the above six positions are indicated as positions where a sound image is finally localized by the sound system 1, these six positions may be collectively referred to as "final positions P". Furthermore, a sound image localized at the final positions P (the sound image finally localized by the sound system 1) may be referred to as a "final sound image". The six final positions P are individually located on the virtual plane 10.

The sound system 1 works with the in-vehicle device 12 (FIG. 3) to shift a position of a sound image and emit alert-related sound in accordance with a direction in which the driver 7 is to direct attention (direction based on the head 8). Specifically, the sound system 1 localizes the sound image to the left side position PL when attention is to be directed to the left side of the head 8, to the right side position PR when the attention is to be directed to the right side of the head 8, to the left front position PLF when the attention is to be directed to the left front of the head 8, to the right front position PRF when the attention is directed to the right front of the head 8, to the front position PF when the attention is to be directed to the front of the head 8, and to the back position PB when the attention is to be directed to the back of the head 8, and emit the alert-related sound. Examples of the alert-related sound include a beep that continues for a certain period of time or a synthesized voice that says, for example, "Please be careful of XXX".

To realize the above functions, the sound system 1 in this embodiment may have a configuration as described below and performs processes as described below.

Figure 3:
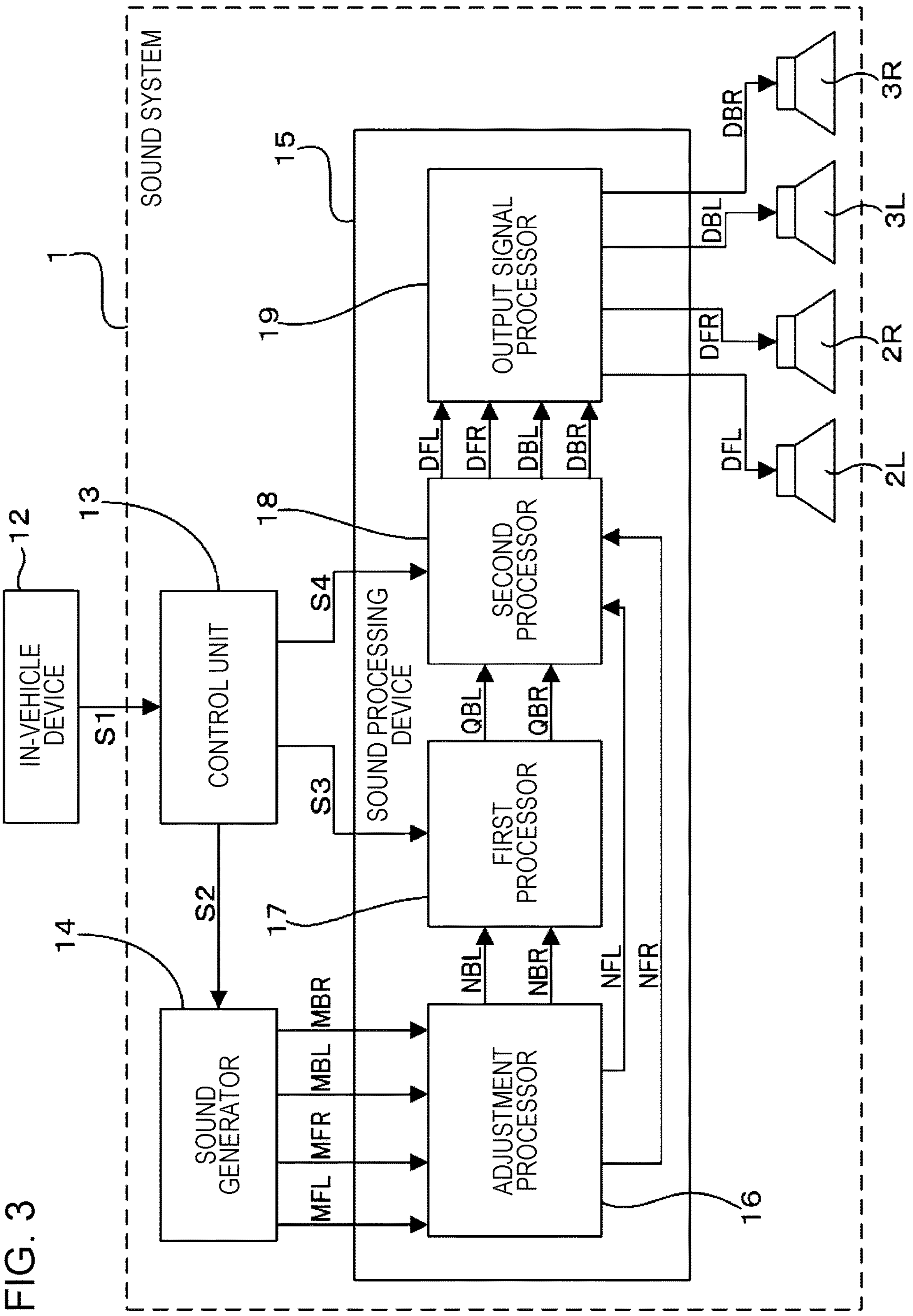
FIG. 3 is a block diagram illustrating an example of a functional configuration of the sound system according to the embodiment of the present disclosure.

FIG. 3 is a block diagram illustrating an example of a functional configuration of the sound system 1 according to this embodiment. As illustrated in FIG. 3, the sound system 1 includes a control unit 13, a sound generator 14, a sound processing device 15, the front speakers 2L and 2R, and the headrest speakers 3L and 3R. The control unit 13 of the sound system 1 is connected to the in-vehicle device 12.

The in-vehicle device 12 is a computer installed in a vehicle. As an example, a car navigation device may function as the in-vehicle device 12.

The control unit 13 is a computer that has at least a function of controlling the sound generator 14 and the sound processing device 15. The control unit 13 includes a processing unit including a CPU, a primary storage device including a volatile memory, such as DRAM, an auxiliary storage device including a ROM, a flash memory, and other nonvolatile memory, and a communication device that realizes communication with external devices. The control unit 13 executes various processes by reading programs stored in the auxiliary storage device to the primary storage device and executing the programs. The control unit 13 may comprise a processor or other processing circuitry configured to execute instructions stored in memory that comprise the processes described herein.

The sound generator 14 is a device that has at least a function of storing sound data and a function of reproducing sound data and outputting a sound signal. The sound generator 14 is connected to the control unit 13 and the sound processing device 15.

The sound processing device 15 is a device that processes signals supplied to the front speakers 2L and 2R and the headrest speakers 3L and 3R. The sound processing device 15 is connected to the control unit 13 and the sound generator 14.

As illustrated in FIG. 3, the sound processing device 15 has, as functional blocks, an adjustment processor 16, a first processor 17, a second processor 18, and an output signal processor 19. Specific examples of configurations of these functional blocks 16 to 19 are described below. However, these functional blocks 16 to 19 are not limited to the specific examples illustrated in this embodiment, but may be configured by any hardware, DSP (Digital Signal Processor), or software. For example, when configured by software, each of the above functional blocks 16 to 19 actually includes a CPU of a computer, a RAM, a ROM, etc., and is realized when a program stored in a recording medium, such as the RAM, the ROM, a hard disk, or a semiconductor memory, is operated.

The following is a detailed description of operation of the sound system 1 when the alert-related sound is to be emitted.

The in-vehicle device 12 determines a final position P (one of the left side position PL, the right side position PR, the left front position PLF, the right front position PRF, the front position PF, and the back position PB) at which a final sound image is localized, triggered by occurrence of a predetermined event, and outputs a control start instruction signal S1 including information on the determined final position P to the control unit 13. For example, the in-vehicle device 12 detects a distance to a preceding vehicle traveling in front of a vehicle having the in-vehicle device 12 which is smaller than a threshold value, determines the front position PF as the final position P where the final sound image is localized, and outputs a control start instruction signal S1 including information indicating the front position PF to the control unit 13. The reason for determining the front position PF in this case is to direct an attention of the driver 7 to the front and thereby alert the driver 7 to the preceding vehicle. In this case, the in-vehicle device 12 has a function of recognizing a distance between the vehicle and the preceding vehicle.

Furthermore, the in-vehicle device 12 detects an object (e.g., pedestrian, obstacle, etc.) that requires attention on the right side (diagonally right front) of the head 8, determines the right front position PRF as the final position P where a final sound image is localized, and sends a control start instruction signal S1 including information indicating the right front position PRF to the control unit 13. The reason for determining the right front position PRF in this case is to direct an attention of the driver 7 to the right front side and thereby alert the driver 7 to the object. In this case, the in-vehicle device 12 has a function of detecting an object that requires attention in the vicinity of the vehicle. Although the two examples of the process of determining a final position P performed by the in-vehicle device 12 has been described above, the examples are merely examples. The in-vehicle device 12 may determine the final position P by various methods instead of the illustrated methods.

Hereinafter, the final position P (one of the left side position PL, the right side position PR, the left front position PLF, the right front position PRF, the front position PF, and the back position PB (refer to FIG. 1)) determined by the in-vehicle device 12 as the position to localize the final sound image is hereinafter referred to as a "determined position."

The control unit 13 executes the following process when receiving the control start instruction signal S1. Specifically, the control unit 13 outputs a sound output instruction signal S2 to the sound generator 14. The control unit 13 also recognizes the determined position based on the control start instruction signal S1 and outputs a first control signal S3 including information indicating the determined position to the first processor 17. For example, when the left side position PL is determined as the final position P1 by the in-vehicle device 12, the control unit 13 outputs the first control signal S3 including information indicating the left side position PL to the first processor 17. Furthermore, the control unit 13 outputs a second control signal S4 including information indicating the determined position to the second processor 18.

The sound generator 14 executes the following process when receiving the sound output instruction signal S2. That is, the sound generator 14 outputs a sound signal corresponding to the alert-related sound to the adjustment processor 16 of the sound processing device 15. Specifically, the sound generator 14 reproduces sound data stored in an accessible storage medium and outputs a left front sound signal MFL for the left front speaker 2L, a right front sound signal MFR for the right front speaker 2R, a left headrest sound signal MBL for the left headrest speaker 3L, and a right headrest sound signal MBR for the right headrest speaker 3R to the adjustment processor 16 of the sound processing device 15. Hereinafter, the left front sound signal MFL, the right front sound signal MFR, the left headrest sound signal MBL, and the right headrest sound signal MBR may be collectively referred to as an "initial sound signal M".

The adjustment processor 16 of the sound processing device 15 performs, in a first stage of a process performed by the first processor 17, a process of reducing a difference in timing of sound that reaches the head 8 when the individual speakers simultaneously emit sound, which is caused by a difference between a physical distance from the headrest speakers 3L and 3R to the head 8 and a physical distance from the front speakers 2L and 2R and the head 8, and a difference in loudness of the sound that reaches the head 8 when the individual speakers simultaneously emit sound of the same loudness. The following is a detailed description of a process performed by the adjustment processor 16.

When receiving the initial sound signal M from the sound generator 14, the adjustment processor 16 executes the following process. Specifically, as illustrated in FIG. 1, there is a large difference between a physical distance between the front speakers 2L and 2R and the head 8 (i.e. a physical distance between the left front speaker 2L and the head 8 or the right front speaker 2R and the head 8) and a physical distance between the headrest speakers 3L and 3R and the head 8 (i.e. a physical distance between the left headrest speaker 3L and the head 8 or the right headrest speaker 3R and the head 8), and the physical distance between the front speakers 2L and 2R and the head 8 is greater than the physical distance between the headrest speakers 3L and 3R and the head 8.

Due to the difference between the physical distance between the front speakers 2L and 2R and the head 8 and the physical distance between the headrest speakers 3L and 3R and the head 8, when the individual speakers simultaneously emit sound, there will be a difference (time lag) between a timing when the sound emitted by the front speakers 2L and 2R reaches the head 8 and a timing when the sound emitted by the headrest speakers 3L and 3R reaches the head 8. When sound is emitted from a plurality of points, a listener is drawn toward sound of first arrival as a listener's feeling, and this phenomenon is referred to as a precedence effect. When the time lag described above is not addressed in any way, the precedence effect causes the listener to feel uncomfortable.

Furthermore, due to the difference between the physical distance between the front speakers 2L and 2R and the head 8 and the physical distance between the headrest speakers 3L and 3R and the head 8, when the individual speakers emit sound of the same loudness, there will be a difference in loudness of the sound when the sound emitted by the individual speakers reaches the head 8. This is because a degree of attenuation of the sound depends on a distance between the speaker and the head 8.

Figure 4:
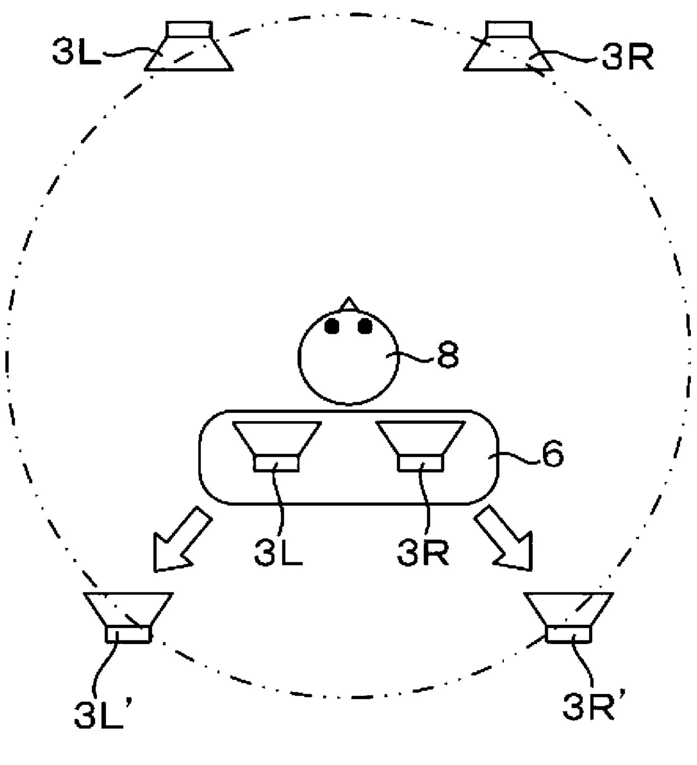
FIG. 4 is a diagram for explaining a process performed by an adjustment processor.

Accordingly, the adjustment processor 16 performs time alignment and volume adjustment so that, when the front speakers 2L and 2R and the headrest speakers 3L and 3R simultaneously emit sound, a timing when the sound reaches the head 8 is the same, and when the individual speakers emit sound of the same volume, the volume of the sound that has reached the head 8 is the same. FIG. 4 is a diagram for explaining the process performed by the adjustment processor 16. As illustrated in FIG. 4, the adjustment processor 16 performs the time alignment and the volume adjustment so that the left headrest speaker 3L is virtually positioned on a virtual circle centered at the head 8 and passing through the front speakers 2L and 2R to function as a left headrest speaker 3L', and similarly the right headrest speaker 3R is virtually positioned on the same virtual circle to function as a right headrest speaker 3R'.

In detail, the adjustment processor 16 includes an attenuation filter which attenuates amplitude of a signal in accordance with a set filter coefficient, and a filter including one or more delay devices ("adjustment filter"). Then, the adjustment processor 16 attenuates amplitude of the left headrest sound signal MBL for the left headrest speaker 3L and the right headrest sound signal MBR for the right headrest speaker 3R at a certain rate and delays the signals by a predetermined period using an adjustment filter. The prescribed filter coefficient is appropriately determined based on prior tests and simulations from the viewpoint that when the individual speakers emit sound of the same loudness, sound volumes when the sound emitted by the individual speakers reach the head 8 are the same. Similarly, the predetermined period is appropriately determined based on prior tests and simulations from the viewpoint that when the individual speakers simultaneously emit sound, the sound emitted from the speakers reaches the head 8 at the same timing.

Furthermore, the adjustment processor 16 outputs a signal obtained after processing (a process of adjusting an amplitude and a process of delaying the signal) the left headrest sound signal MBL to the first processor 17 as an adjusted left headrest signal NBL. Moreover, the adjustment processor 16 outputs a signal obtained after processing the right headrest sound signal MBR to the first processor 17 as an adjusted right headrest signal NBR. In other words, in this embodiment, the signal for the left headrest speaker 3L and the signal for the right headrest speaker 3R are output from the adjustment processor 16 to the first processor 17.

The adjustment processor 16 outputs the left front sound signal MFL as an adjusted left front signal NFL to the second processor 18. Furthermore, the adjustment processor 16 outputs the right front sound signal MFR as an adjusted right front signal NFR to the second processor 18. In other words, in this embodiment, a signal for the left front speaker 2L and a signal for the right front speaker 2R are output from the adjustment processor 16 to the second processor 18. Note that, in this embodiment, the adjustment processor 16 does not perform an amplitude adjustment process or a signal delay process on the left front sound signal MFL and the right front sound signal MFR, and therefore, the adjustment processor 16 outputs the left front sound signal MFL as it is as the adjusted left front signal NFL to the second processor 18 and outputs the right front sound signal MFL as it is to the second processor 18 as the adjusted right front signal NFR to the second processor 18. However, in a case where the function of the adjustment processor 16 is realized by a method other than the method of this embodiment, when the left front sound signal MFL and the right front sound signal MFR are processed, the processed signals are output as the adjusted left front signal NFL and the adjusted right front signal NFR from the adjustment processor 16 to the second processor 18.

Note that the specific configuration and the specific processing of the adjustment processor 16 are not limited to those illustrated in this embodiment. Specifically, when the function of the adjustment processor 16 is realized, a configuration different from that illustrated in this embodiment may be employed and different processing may be executed. As an example, the adjustment processor 16 may be configured to amplify the left front sound signal MFL and the right front sound signal MFR by a predetermined filter instead of attenuating the left headrest sound signal MBL and the right headrest sound signal MBR.

The first processor 17 performs a trans-aural process on signals corresponding to the headrest speakers 3L and 3R so that a tentative sound image is localized by the headrest speakers 3L and 3R at the tentative position V in the region that does not include the front side relative to the head 8 but includes the left and right sides and the back side relative to the head 8. The first processor 17 will be described in detail below.

Figure 5:
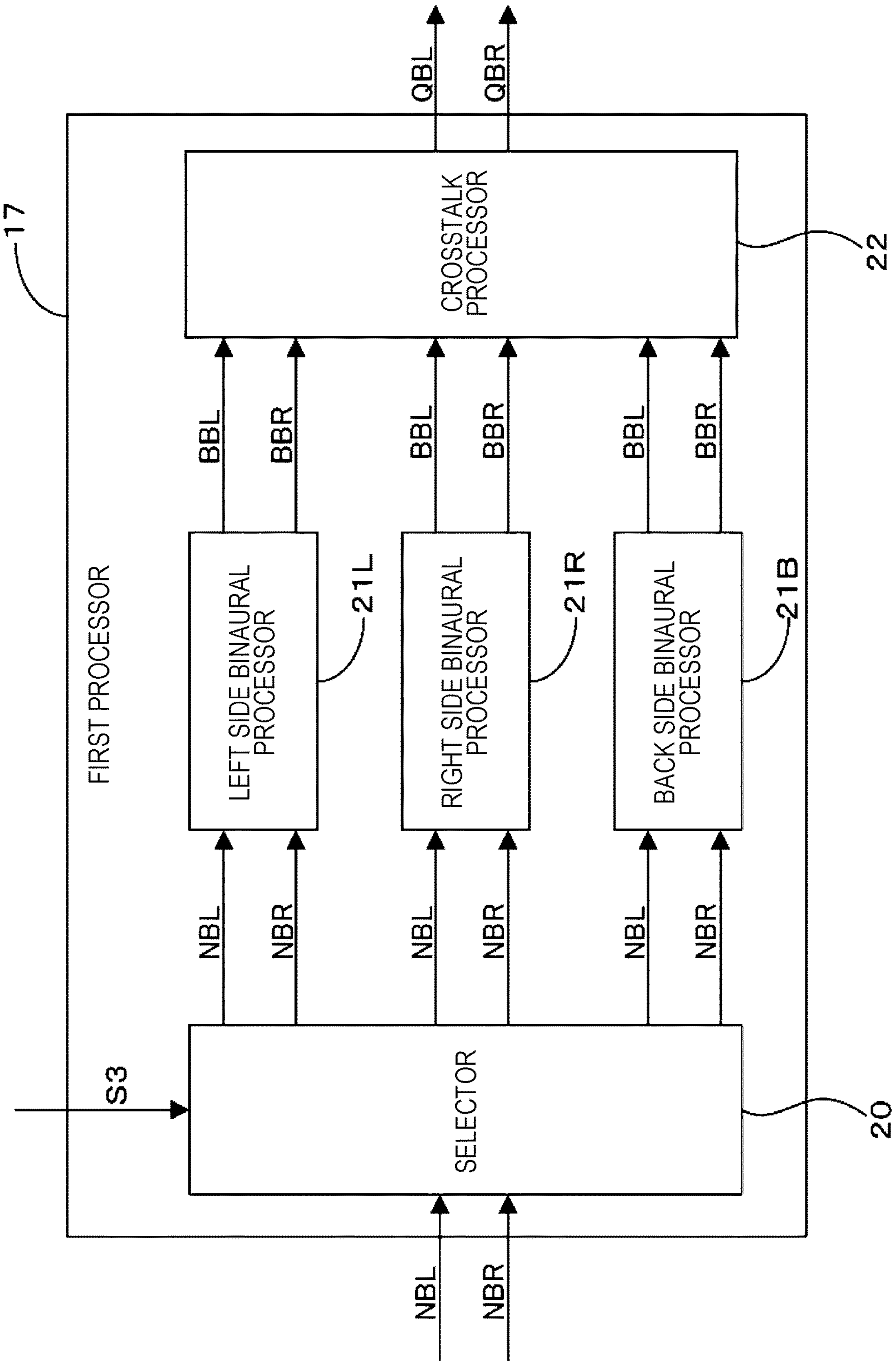
FIG. 5 is a diagram illustrating a configuration example of a first processor.

FIG. 5 is a diagram schematically illustrating a configuration of the first processor 17. As illustrated in FIG. 5, the first processor 17 includes a selector 20, a left side binaural processor 21L, a right side binaural processor 21R, a back side binaural processor 21B, and a crosstalk processor 22. Hereinafter, when the left side binaural processor 21, the right side binaural processor 21R, and the back side binaural processor 21B are not distinguished from one another, they are referred to as “binaural processors 21”.

The selector 20 receives the first control signal S3 from the control unit 13. The selector 20 also receives the adjusted left headrest signal NBL and the adjusted right headrest signal NBR from the adjustment processor 16. The selector 20 then switches an output destination of the adjusted left headrest signal NBL and the adjusted right headrest signal NBR to one of the three binaural processors 21 based on the first control signal S3.

Specifically, the selector 20 switches an output destination to the left side binaural processor 21L when receiving the first control signal S3 including information indicating the left side position PL or the left front position PLF. Furthermore, the selector 20 switches the output destination to the right side binaural processor 21R when receiving the first control signal S3 including information indicating the right side position PR or the right front position PRF. Furthermore, the selector 20 switches the output destination to the back side binaural processor 21B when receiving the first control signal S3 including information indicating the front position PF or the back position PB.

Figure 6:
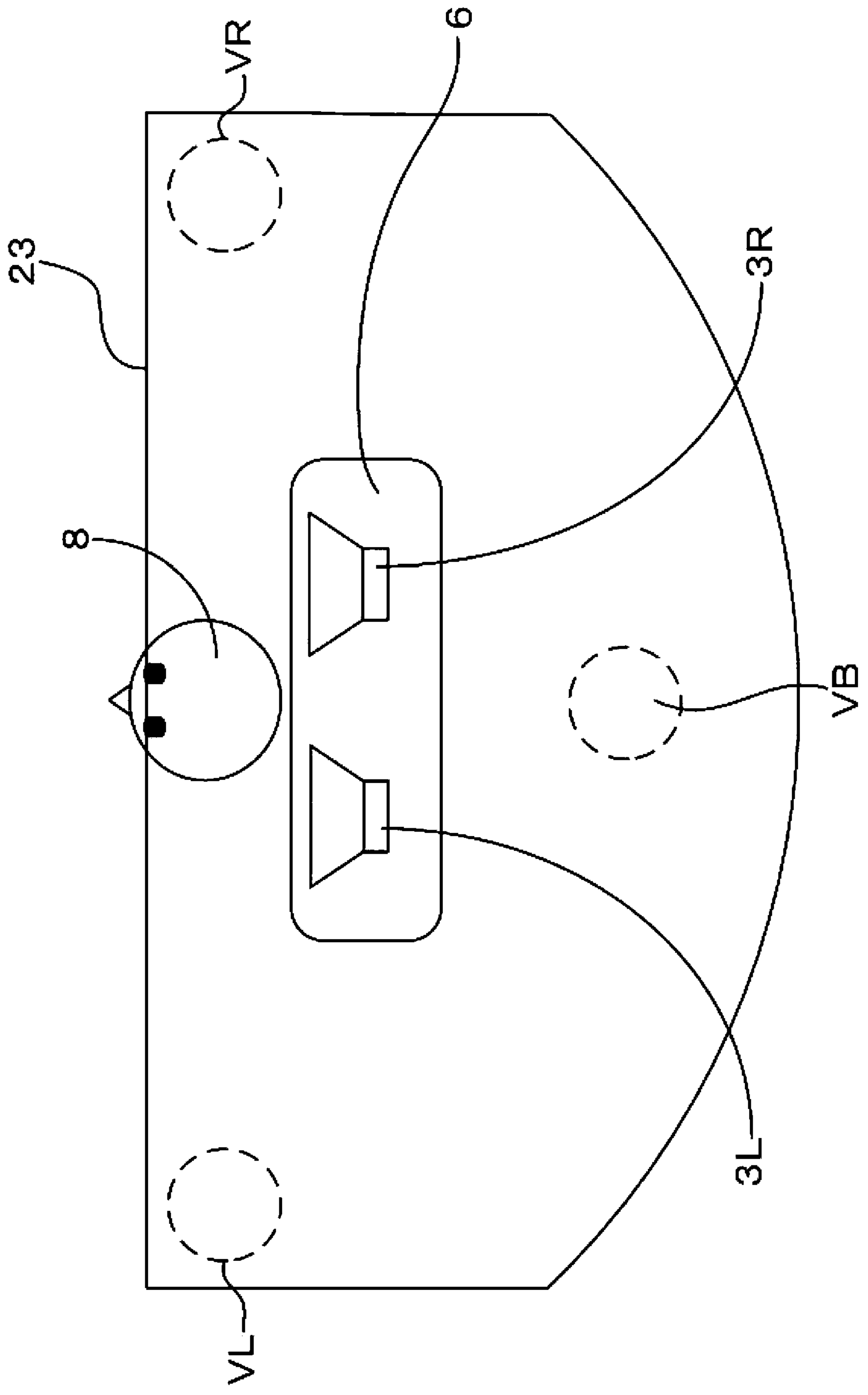
FIG. 6 is a diagram illustrating a region around a head.

Prior to the description of the binaural processor 21, a head side-back region 23 and the tentative position V will be described. FIG. 6 is a diagram illustrating the headrest portion 6 and the head 8, as well as the head side-back region 23 and the tentative position V. As illustrated in FIG. 6, the head side-back region 23 does not include the front side relative to the head 8, but includes the left and right sides and the back side relative to the head 8. In other words, the head side-back region 23 does not include the front side relative to the head 8 or the diagonally front side relative to the head 8. In the head side-back region 23, the left side tentative position VL, the right side tentative position VR, and the back side tentative position VB are defined.

The left side tentative position VL is a position on the left side relative to the head 8 within the head side-back region 23. The left side tentative position VL is the same position as the left side position PL (FIG. 1). The right side tentative position VR is the position on the right side relative to the head 8 within the head side-back region 23. This right side tentative position VR is the same position as the right side position PR (FIG. 1). The back side tentative position VB is a position on the back side relative to the head 8 within the head side-back region 23. The back side tentative position VB is the same position as the back position PB (FIG. 1). Hereinafter, the left side tentative position VL, the right side tentative position VR, and the back side tentative position VB are collectively referred to as a “tentative position V”. Furthermore, as will become clear later, a sound image is localized (not final localization, but tentative localization) by the first processor 17 at the tentative position V corresponding to a determined position. A sound image localized at the tentative position V is hereinafter referred to as a “tentative sound image”.

Now the left side binaural processor 21 performs the following processing. Specifically, the left side binaural processor 21L performs a binaural process on the input adjusted left headrest signal NBL and the input adjusted right headrest signal NBR so that the tentative sound image is localized at the left side tentative position VL based on sound emitted from the headrest speakers 3L and 3R. In other words, when the determined position is the left side position PL or the left front position PLF, the first processor 17 localizes a tentative sound image at the left side tentative position VL.

In detail, after a real speaker is installed in the left side tentative position VL and sound is emitted from a real speaker to a dummy head (dummy head for an experiment) which is substitute of the head 8, a head transfer function of the sound from the real speaker to a left ear of the dummy head and a head transfer function of the sound from the real speaker to a right ear of the dummy head are measured in advance. The left side binaural processor 21L includes a dedicated filter and performs a binaural process on signals input through the dedicated filter to reflect the binaural head transfer functions, and outputs a left side binaural signal BBL for the left headrest speaker 3L and a right side binaural signal BBR for the right headrest speaker 3R to the crosstalk processor 22.

The right side binaural processor 21R processes the input signal with the dedicated filter so that a tentative sound image is localized at the right side tentative position VR, and outputs the left side binaural signal BBL and the right side binaural signal BBR to the crosstalk processor 22. In other words, when the determined position is the right side position PR or the right front position PRF, the first processor 17 localizes a tentative sound image at the right side tentative position VR. The configuration and the process of the right side binaural processor 21R is the same as that of the left side binaural processor 21. The head transfer function used by the right side binaural processor 21R (the binaural head transfer function applied to the filter) is measured in advance using a real speaker and a dummy head installed at the right side tentative position VR.

The back side binaural processor 21B processes the input signal with the dedicated filter so that a tentative sound image is localized at the back side tentative position VB, and outputs the left side binaural signal BBL and the right side binaural signal BBR to the crosstalk processor 22. In other words, when the determined position is the front position PF or the back position PB, the first processor 17 localizes a tentative sound image at the back side tentative position VB. The configuration and the process of the back side binaural processor 21B is the same as that of the left side binaural processor 21L. The head transfer function used by the back side binaural processor 21B (the binaural head transfer function applied to the filter) is measured in advance using a real speaker and a dummy head installed at the right side tentative position VR.

The crosstalk processor 22 of the first processor 17 processes the input left binaural signal BBL and the input fight binaural signal BBR so that a position of a localized sound image is localized at the corresponding tentative position V as much as possible by removing an effect of the head transfer function from in the sound emitted from the left headrest speaker 3L and the right headrest speaker 3R.

Here, “the head transfer function of the sound from the actual left headrest speaker 3L to the left ear of the dummy head”, “the head transfer function of the sound from the actual left headrest speaker 3L to the right ear of the dummy head”, “the head transfer function of the sound from the actual right headrest speaker 3R to the left ear of the dummy head”, and “the head transfer function of the sound from the actual right headrest speaker 3R to the right ear of the dummy head” are measured in advance. For each of these head transfer functions, the crosstalk processor 22 has a dedicated filter that processes a signal in accordance with an inverse function of the head transfer function. The crosstalk processor 22 performs a filtering process to remove spatial crosstalk components from left and right binaural signals using the corresponding dedicated filters, and outputs a left headrest tentative signal QBL for the left headrest speaker 3L and a right headrest tentative signal QBR for the right headrest speaker 3R to the second processor 18 in a subsequent stage.

It is assumed here that the determined position is the left side position PL or the left front position PLF. In this case, the selector 20 switches a signal output destination to the left side binaural processor 21L, and a signal is processed in the order of the selector 20, the left side binaural processor 21, and the crosstalk processor 22, and finally, the crosstalk processor 22 outputs to the second processor 18 the left headrest tentative signal QBL and the right headrest tentative signal QBR. In this case, it is assumed that the left headrest speaker 3L is driven by the left headrest tentative signal QBL and the right headrest speaker 3R is driven by the right headrest tentative signal QBR (naturally, D/A conversion and amplification by an amplifier are assumed to be performed). In this case, a sound image is localized at the left side tentative position VL (=left side position PL). Similarly, it is assumed that the determined position is the right side position PR or the right front position PRF. In this case, when the headrest speakers 3L and 3R are driven by the left headrest tentative signal QBL and the right headrest tentative signal QBR, respectively, a sound image is localized at the right side tentative position VR (=right side position PR). Furthermore, it is assumed that the determined position is the front position PF or the back position PB. In this case, when the headrest speakers 3L and 3R are driven by the left headrest tentative signal QBL and the right headrest tentative signal QBR, respectively, the sound image is localized at the back side tentative position VB (=back position PB).

As described above, in the first processor 17, the binaural process of the binaural processor 21 and the process of removing spatial crosstalk components by the crosstalk processor 22 are successively performed. This combination of the binaural process and the process of removing spatial crosstalk components corresponds to the "trans-aural process," which is a signal process performed to localize a sound image at a target position. Specifically, the first processor 17 performs the trans-aural process on signals corresponding to the headrest speakers 3L and 3R so that a tentative sound image is localized at the tentative position V within the head side-back region 23. More specifically, the first processor 17 performs the trans-aural process so that a tentative sound image is localized at the left side tentative position VL when the determined position is the left side position PL or the left front position PLF. Furthermore, the first processor 17 performs the trans-aural process so that a tentative sound image is localized at the right side tentative position VR when the determined position is the right side position PR or the right front position PRF. Moreover, the first processor 17 performs the trans-aural process so that a tentative sound image is localized at the back side tentative position VB when the determined position is the front position PF or the back position PB.

Although the first processor 17 has been described hereinabove, the specific configuration and the specific processing of the first processor 17 are not limited to those illustrated in this embodiment. Specifically, as long as the functions of the first processor 17 are realized, a configuration different from that illustrated in this embodiment may be employed, and different processing may be executed. As an example, the first processor 17 may not be configured to switch the binaural processor 21 in accordance with the tentative position V where a tentative sound image is localized, but rather to change a filter coefficient to be applied to the filter.

The second processor 18 performs amplitude panning on signals corresponding to the front speakers 2L and 2R and signals after processing by the first processor 17 so that a final sound image is localized at the final position P between the tentative sound image and the front speakers 2L and 2R using the tentative sound image localized at the tentative position V by the first processor 17 and a difference in volume between the front speakers 2L and 2R. Hereinafter, the second processor 18 will be described in detail.

The second processor 18 receives the second control signal S4 from the control unit 13. The second processor 18 inputs the adjusted left front signal NFL for the left front speaker 2L and the adjusted right front signal NFR for the right front speaker 2R from the adjustment processor 16. Furthermore, the second processor 18 inputs the left headrest tentative signal QBL for the left headrest speaker 3L and the right headrest tentative signal QBR for the right headrest speaker 3R from the first processor 17. The second processor 18 then performs the following processing in accordance with contents of the second control signal S4. The following is a case-by-case description of the processing performed by the second processor 18.

In Case Where Second Control Signal S4 Including Information Indicating Left Side Position PL is Input When the second control signal S4 including information indicating the left side position PL is input, the second processor 18 performs the following processing. Note that the input of the second control signal S4 including information indicating the left side position PL means that the determined position is the left side position PL.

In this case, the second processor 18 performs the following processing on each of input signals. That is, the adjusted left front signal NFL for the left front speaker 2L and the adjusted right front signal NFR for the right front speaker 2R are eliminated (corresponding drive signals are not output). The signal elimination is performed, for example, by a filtering process of causing amplitude to be zero. On the other hand, the second processor 18 outputs the input left headrest tentative signal QBL as it is as a left headrest drive signal DBL and also outputs the input right headrest tentative signal QBR as it is as a right headrest drive signal DBR.

Here, the output signal processor 19 at a subsequent stage of the second processor 18 includes a D/A conversion circuit and an amplifier, which performs D/A conversion and required amplification, respectively, on an input signal and supplies the signal to the individual speakers. Specifically, the output signal processor 19 performs, in response to an input of the left front driving signal DFL for the left front speaker 2L, D/A conversion and amplification on the signal and supplies the signal to the left front speaker 2L. Furthermore, the output signal processor 19 performs, in response to the input of the right front drive signal DFR for the right front speaker 2R, D/A conversion and amplification on the signal and supplies the signal to the right front speaker 2R. Furthermore, the output signal processor 19 performs, in response to an input of the left headrest drive signal DBL for the left headrest speaker 3L, D/A conversion and amplification on the signal and supplies the signal to the left headrest speaker 3L. Furthermore, the output signal processor 19 performs, in response to an input of the right headrest drive signal DBR for the right headrest speaker 3R, D/A conversion and amplification on the signal and supplies the signal to the right headrest speaker 3R.

In this case (i.e., when the determined position is the left side position PL), the left front drive signal DFL based on the adjusted left front signal NFL is not supplied to the left front speaker 2L, nor the right front drive signal DFR based on the adjusted right front signal NFR to the right front speaker 2R. Therefore, the front speakers 2L and 2R are not driven.

On the other hand, the left headrest drive signal DBL based on the left headrest tentative signal QBL is supplied to the left headrest speaker 3L, and the right headrest drive signal DBR based on the right headrest tentative signal QBR is supplied to the right headrest speaker 3R. In this case, the left headrest tentative signal QBL and the right headrest tentative signal QBR are signals that form a tentative sound image at the left side tentative position VL. The left lateral tentative position VL coincides with the left side position PL. Therefore, in this case, as a result of the processing described above performed by the second processor 18, a final sound image is localized at the left side position PL. Specifically, when the determined position is the left side position PL, a sound image is finally localized at the left side position PL. Therefore, in this case, the driver 7 (listener) hears the alert-related sound with the sensation that the sound is being output from a sound source located at the left side position PL.

In Case Where Second Control Signal S4 Including Information Indicating Right Side Position PR is Input When the second control signal S4 including information indicating the right side position PR is input, the second processor 18 performs the following processing. Note that the input of the second control signal S4 including information indicating the right side position PR means that the determined position is the right side position PR. The processing of the second processor 18 in this case is the same as that of the second processor 18 when the determined position is the left side position PL, and therefore, the processing will be briefly described.

In this case, the second processor 18 eliminates the adjusted left front signal NFL and the adjusted right front signal NFR. On the other hand, the second processor 18 outputs the left headrest tentative signal QBL to the output signal processor 19 as it is as the left headrest drive signal DBL, and also outputs the input right headrest tentative signal QBR to the output signal processor 19 as it is as the right headrest drive signal DBR. As a result, a final sound image is localized at the right side position PR.

In Case Where Second Control Signal S4 Including Information Indicating Back Position PB is Input When the second control signal S4 including information indicating the back position PB is input, the second processor 18 performs the following processing. Note that the input of the second control signal S4 including information indicating the back position PB means that the determined position is the back position PB. The processing of the second processor 18 in this case is the same as that of the second processor 18 when the determined position is the left side position PL, and therefore, the processing will be briefly described.

In this case, the second processor 18 eliminates the adjusted left front signal NFL and the adjusted right front signal NFR. On the other hand, the second processor 18 outputs the left headrest tentative signal QBL to the output signal processor 19 as it is as the left headrest drive signal DBL, and also outputs the input right headrest tentative signal QBR to the output signal processor 19 as it is as the right headrest drive signal DBR. As a result, the final sound image is localized at the back position PB.

In Case Where Second Control Signal S4 Including Information Indicating Left Front Position PLF is Input When the second control signal S4 including information indicating the left front position PLF is input, the second processor 18 performs the following processing. Note that the input of the second control signal S4 including information indicating the left front position PLF means that the determined position is the left front position PLF.

In this case, the second processor 18 performs the following processing on each of input signals. In other words, the adjusted right front signal NFR for the right front speaker 2R is eliminated (corresponding drive signal is not output). Therefore, the right front speaker 2R is not driven in this case. On the other hand, the second processor 18 performs amplitude panning so that a final sound image is localized at the left front position PLF which is a position between a tentative sound image and the left front speaker 2L using a difference in volume between the tentative sound image (tentative sound image localized at the left front tentative position VL) and the left front speaker 2L, on the adjusted left front signal NFL, the left headrest tentative signal QBL, and the right headrest tentative signal QBR.

Figure 7:
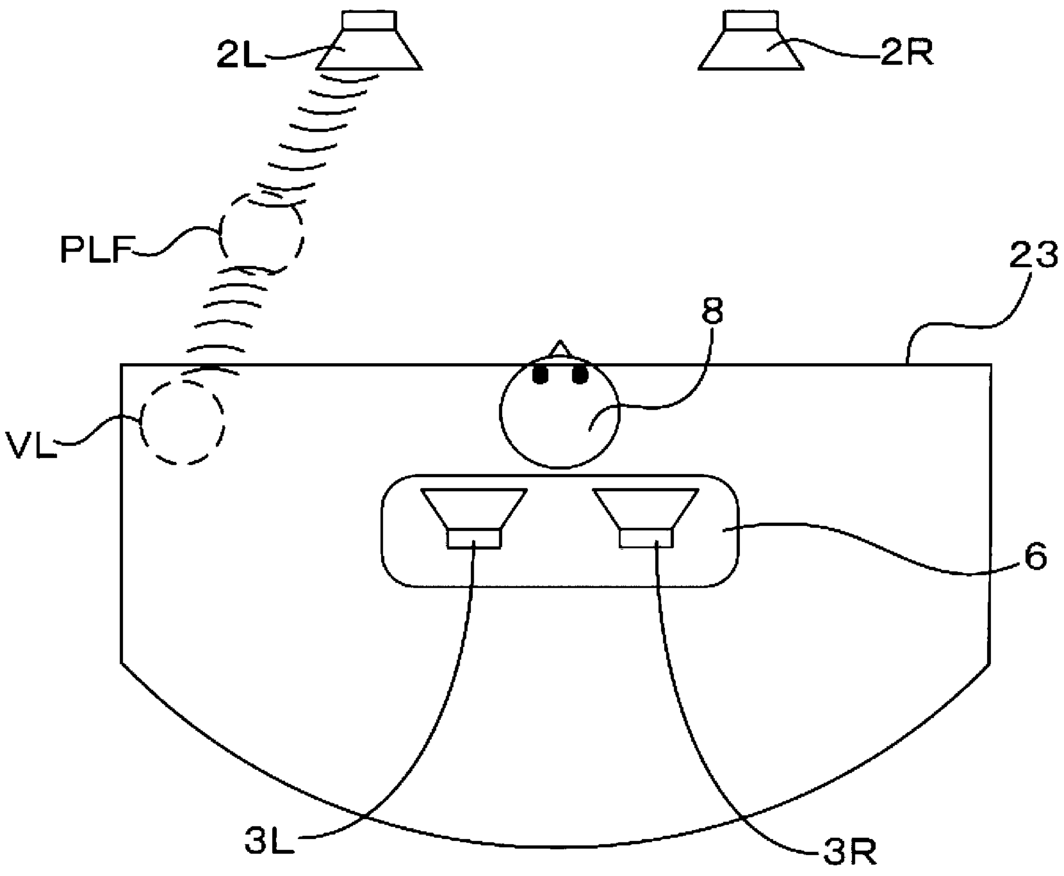
FIG. 7 is a diagram for explaining a process performed by a second processor.

FIG. 7 is a diagram for explaining a process performed by the second processor 18 in this case. As mentioned above, the left front position PLF is located between the left front speaker 2L and the left side position PL. The left side position PL coincides with the left side tentative position VL, which is a position where the tentative sound image is localized by the first processor 17 in this case.

Here, the amplitude panning, which localizes a sound image in a space between speakers using a difference in volume of the speakers, has been used for a plurality of speakers installed at a distance from each other. Then, referring to FIG. 7, the second processor 18 performs the amplitude panning so that a sound image is localized at the left front position PLF using a difference in volume between the sound of the tentative sound image (the sound that is regarded as emitted from the virtually localized sound image) and the sound of the left front speaker 2L. Specifically, the second processor 18 amplifies or attenuates amplitude of the adjusted left front signal NFL by the first filter coefficient and outputs the signal as the left front drive signal DFL. Furthermore, the second processor 18 amplifies or attenuates amplitude of the left headrest tentative signal QBL by the filter with a second filter coefficient and outputs the signal as the left headrest drive signal DBL. Moreover, the second processor 18 amplifies or attenuates amplitude of the right headrest tentative signal QBR by the filter with a third filter coefficient and outputs the signal as the right headrest drive signal DBR. The first filter coefficient, the second filter coefficient, and the third filter coefficient are determined based on results of prior experiments and simulations from the viewpoint that a final sound image is localized at the left front position PLF using a difference in volume between sound of a tentative sound image localized at the left side tentative position VL and sound of the left front speaker 2L.

As a result of the above process, a final sound image is localized at the left side position PL in this case, that is, when the determined position is the left front position PLF. Therefore, the driver 7 hears the alert-related sound with the sensation that the sound is being output from a sound source located at the left side position PL.

As described above, when the final sound image is localized in the left front relative to the head 8, the left front speaker 2L is used among the front speakers 2L and 2R. The first processor 17 then performs the trans-aural process so that a tentative sound image is localized at the left side tentative position VL (tentative position) on the left side of the head 8. Furthermore, the second processor 18 performs amplitude panning so that a final sound image is localized at the left front position PLF (final position) between the tentative sound image and the left front speaker 2L in accordance with a difference in volume between the tentative sound image and the left front speaker 2L.

As described above, in this embodiment, when a sound image is localized to the left front of the head 8, it is not the case that, as in JP 2003-111200 A, only the headrest speakers are used as speakers and a sound image is localized by the trans-aural process performed on signals supplied to the headrest speakers. In other words, in this embodiment, not only the headrest speakers 3L and 3R but also the left front speaker 2L is used as speakers. Then, the sound processing device 15 localizes a tentative sound image at the left side tentative position VL in the head side-back region 23 by the trans-aural process performed on the signals supplied to the headrest speakers 3L and 3R, and a final sound image is localized at the left front position PLF by the amplitude panning for the tentative sound image and the left front speaker 2L. This produces the following effects.

That is, according to this embodiment, when a sound image is localized in the left front of the head 8, the left front speaker 2L is used together with the headrest speakers 3L and 3R to achieve the localization of the sound image, and therefore, sound from the headrest speakers 3L and 3R is supplemented by sound from the front speaker 2L, thus improving the sense of presence felt by the driver 7 (listener) when compared to conventional techniques that localizes a sound image using only the headrest speakers 3L and 3R.

Furthermore, in the trans-aural process, a fixed head transfer function measured using a dummy head is used instead of a head transfer function which is variable for each listener. When a fixed value is used as the head transfer function, sound image localization based on the trans-aural process alone has a problem in that it is difficult to localize a sound image on the front side relative to the head 8 (including the front, a diagonally right front, and a diagonally left front). On the other hand, in this embodiment, when the sound processing device 15 localizes a final sound image in the left front side of the head 8, the localization of the sound image by the trans-aural process (i.e., the localization of a tentative sound image by the first processor 17) is performed within the head side-back region 23 (i.e., a position avoiding the front side of the head 8). The sound processing device 15 then localizes a sound image (final sound image) at the left front of the head 8 by the amplitude panning for the front speaker 2L and the tentative sound image. This allows the above problems to be resolved. The effects described above are effects that are widely obtained when a sound image is localized on the front side (in this embodiment, when a sound image is localized at the front position PF in front of the head 8 and the right front position PRF on the right front side relative to the head 8).

In Case Where Second Control Signal S4 Including Information Indicating Right Front Position PRF is Input When the second control signal S4 including information indicating the right front position PRF is input, the second processor 18 performs the following processing. Note that the input of the second control signal S4 including information indicating the right front side position PRF means that the determined position is the right front side position PRF. Note that the processing of the second processor 18 in this case is the same as that of the second processor 18 when the determined position is the left front position PLF, and therefore, the processing will be briefly described.

In this case, the second processor 18 eliminates (does not output a corresponding drive signal) the adjusted left front signal NFL for the left front speaker 2L. On the other hand, the second processor 18 performs the amplitude panning so that a final sound image is localized at the right front position PRF (final position) which is a position between a tentative sound image and the right front speaker 2R using a difference in volume between the tentative sound image (tentative sound image localized at the right front tentative position VR in this case) and the right front speaker 2R on the adjusted right front signal NFR, the left headrest tentative signal QBL, and the right headrest tentative signal QBR.

Specifically, the second processor 18 individually amplifies or attenuates the adjusted right front signal NFR, the left headrest tentative signal QBL, and the left headrest tentative signal QBL with the appropriate filter coefficients using the filters, and outputs the left front drive signal DFL, the left headrest drive signal DBL, and the right headrest drive signal DBR. The amplification or the attenuation of each signal is performed with the object of localizing a final sound image at the right front position PRF (final position) by means of a difference in volume between a tentative sound image localized at the right side tentative position VR and the right front speaker 2R, and the filter coefficients of the respective filters for individual signals are appropriately set based on prior tests and simulations to achieve this object. As a result of the above process, when the determined position is the right front position PRF, the final sound image is localized at the right front position PRF.

As described above, when the final sound image is localized to the right front of the head, the right front speaker 2R is used among the pair of front speakers 2L and 2R. The first processor 17 then executes the trans-aural process so that the tentative sound image is localized at the right side position PR (tentative position) on the right side of the head 8. The second processor 18 also performs the amplitude panning so that the final sound image is localized at the right front position PRF between the tentative sound image and the right front speaker 2R according to a difference in volume between the tentative sound image and the right front speaker 2R.

In Case Where Second Control Signal S4 including Information Indicating Front Position PRF is Input When the second control signal S4 including information indicating the front position PF is input, the second processor 18 performs the following processing. Note that the input of the second control signal S4 including information indicating the front position PF means that the determined position is the front side position PRF.

Figure 8:
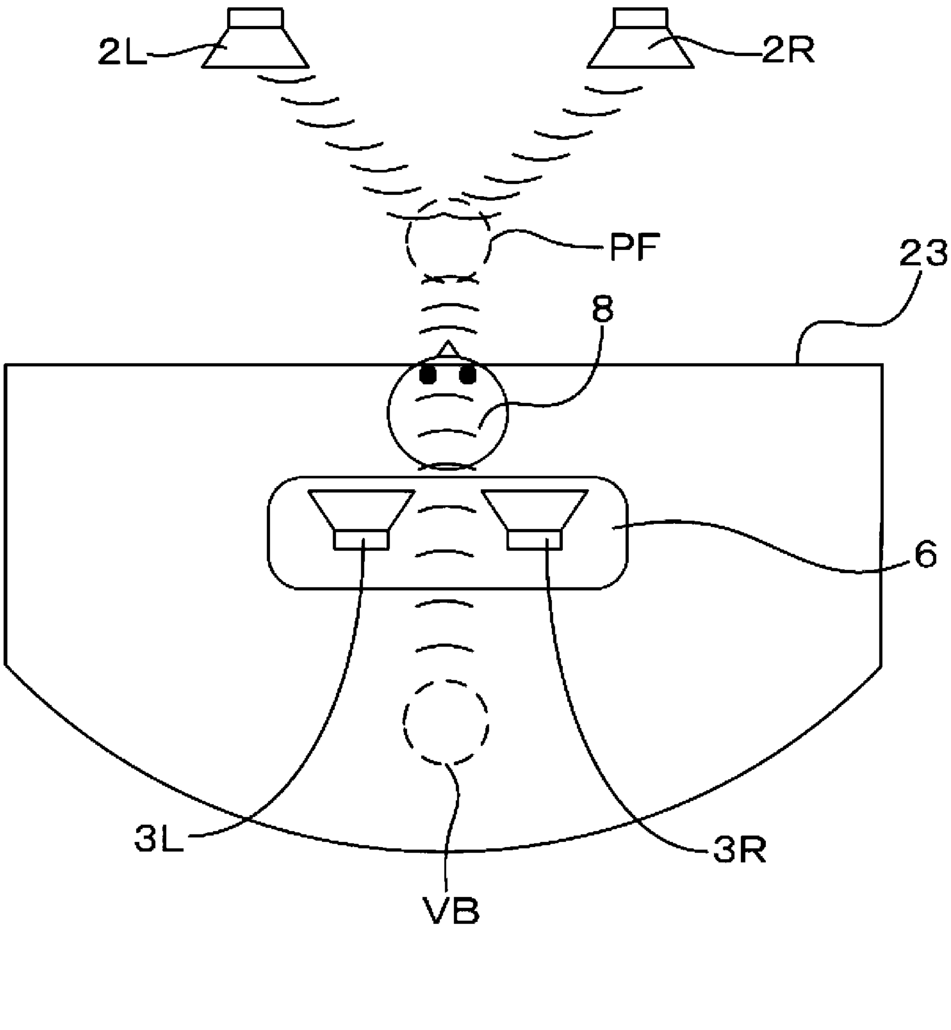
FIG. 8 is a diagram for explaining a process performed by the second processor.

FIG. 8 is a diagram for explaining a process performed by the second processor 18 in this case. In this case, the second processor 18 performs the following processing on each of input signals. Specifically, the second processor 18 performs the amplitude panning so that a final sound image is localized at the front position PF (final position) which is a position between a tentative sound image and the front speakers 2L and 2R using a difference in volume between the tentative sound image (tentative sound image localized at the back tentative position VR in this case) and the front speakers 2L and 2R on the adjusted right front signal NFR, the adjusted left front signal NFL, the left headrest tentative signal QBL, and the right headrest tentative signal QBR. In FIG. 8, a state in which the final sound image is localized at the front position PF is illustrated. Note that, as described above, the front position PF is a position between the front speakers 2L and 2R and the back position PB. The back position PB coincides with the back side tentative position VB, which is a position where a tentative sound image was localized by the first processor 17 in this case.

Specifically, the second processor 18 amplifies or attenuates amplitude of the adjusted left front signal NFL by a filter with a fourth filter coefficient and outputs the signal as the left front drive signal DFL to the output signal processor 19. Furthermore, the second processor 18 amplifies or attenuates amplitude of the adjusted right front signal NFR by a filter with a fifth filter coefficient and outputs the signal as the right front drive signal DFR. Furthermore, the second processor 18 amplifies or attenuates amplitude of the left headrest tentative signal QBL by the filter with a sixth filter coefficient and outputs the signal as the left headrest drive signal DBL. Moreover, the second processor 18 amplifies or attenuates amplitude of the right headrest tentative signal QBR by the filter with a seventh filter coefficient and outputs the signal as the right headrest drive signal DBR. The fourth through seventh filter coefficients are determined based on results of prior experiments and simulations from the viewpoint that the sound image is localized at the front position PF by a difference in volume between the sound of the tentative sound image localized at the back side tentative position VB and sound of the front speakers 2L and 2R.

As a result of the above process, when the determined position is the front position PF, the final sound image is localized at the front position PF. Therefore, the driver 7 hears the alert-related sound with the sensation that the sound is being output from a sound source located at the front position PF.

As described above, when the final sound image is localized in front of the head 8, the pair of front speakers 2L and 2R are used. The first processor 17 then executes the trans-aural process so that a tentative sound image is localized at the back side tentative position VB on the back side of the head 8. Furthermore, the second processor 18 performs the amplitude panning so that a final sound image is localized at the front position PF (final position) between the tentative sound image and the front speakers 2L and 2R in accordance with a difference in volume between the tentative sound image and the front speakers 2L and 2R.

The output signal processor 19 performs the D/A conversion and the amplification on the input drive signal as described above, and supplies the signal to the corresponding speaker SP. Accordingly, each speaker SP is driven to emit sound. However, as described above, depending on the determined position, at least one of the speakers SP is not driven.

Figure 9:
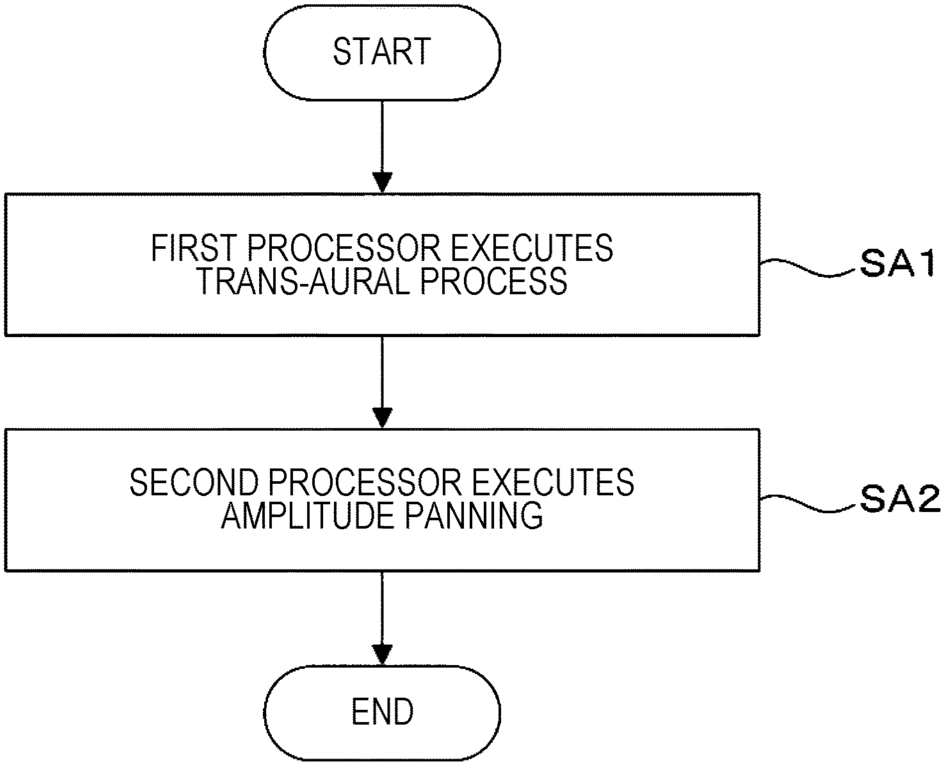
FIG. 9 is a flowchart of a sound processing method employed in a sound processing device according to the embodiment of the present disclosure.

Next, the sound processing method by the sound processing device 15 will be described with reference to a flowchart. FIG. 9 is a flowchart of the sound processing method employed in the sound processing device 15. In FIG. 9, key operations performed by the sound processing device 15 are illustrated.

As illustrated in FIG. 9, the first processor 17 of the sound processing device 15 performs the trans-aural process on signals corresponding to the headrest speakers 3L and 3R so that a tentative sound image is localized at the tentative position in the head side-back region 23 including the left and right sides and the back side of the head 8 (step SA1).

The second processor 18 of the sound processing device 15 performs the amplitude panning on signals corresponding to the front speakers 2L and 2R and signals after processing by the first processor 17 so that a final sound image is localized at a final position between the tentative sound image and the front speakers 2L and 2R using a tentative sound image and a difference in volume between the front speakers 2L and 2R (step SA2).

As described above, the sound processing device 15 has the following configuration. That is, the sound processing device 15 processes signals supplied to the plurality of headrest speakers 3L and 3R installed in the headrest portion 6 of the seat 5 and one or more of the front speakers 2L and 2R that are installed on the front side relative to the head 8 of the listener (the driver 7 in this embodiment) when the listener is seated in the seat 5 and facing forward and emit sound toward the head 8. The sound processing device 15 includes the first processor 17 that performs the trans-aural process on the signals corresponding to the plurality of headrest speakers 3L and 3R so that a tentative sound image is localized by the plurality of headrest speakers 3L and 3R at a tentative position within the head side-back region 23 which does not include the front side of the head 8 but includes the left and right sides and the back side of the head 8, and the second processor 18 that performs the amplitude panning on signals corresponding to the front speakers 2L and 2R and a signal processed by the first processor 17 so that a final sound image is localized at a final position between a tentative sound image and the front speakers 2L and 2R in accordance with a difference in volume between the tentative sound image and the front speakers 2L and 2R.

With this configuration, the localization of a tentative sound image in "a region that does not include a front side of the head 8 but includes left, right, and back sides of the head 8" by a trans-aural process performed on a signal corresponding to a headrest speakers 3L and 3R and the localization of a final sound image by the amplitude panning process performed on signals corresponding to the tentative sound image (virtual sound image) and signals corresponding to the front speakers 2L and 2R (actual speakers). In other words, in this embodiment, not only the headrest speakers 3L and 3R but also the front speakers 2L and 2R are used, and furthermore, taking advantage of the fact that the front speakers 2L and 2R are used, the two-stage process of localization of a tentative sound image and subsequent localization of a final sound image as described above is performed so that the final sound image is localized. This technique is a new technique for sound image localization that is distinct from existing techniques of localizing a virtual sound image on the front side of the head 8 by means of the trans-aural process performed on signals corresponding to the headrest speakers 3L and 3R. In particular, according to this embodiment, since the front speakers 2L and 2R are used together with the headrest speakers 3L and 3R to achieve sound image localization, sound from the headrest speakers 3L and 3R is supplemented by sound from the front speakers 2L and 2R, which improves the sense of presence felt by the listener, when compared to general techniques that use only the headrest speakers 3L and 3R to localize a sound image. Specifically, this embodiment provides a novel technique for sound image localization that contributes to realization of a novel method for allowing a listener to listen sound with improved sense of presence, in the system that allows the listener to listen sound using head speakers.

Although the embodiment of the present disclosure is described hereinabove, the foregoing embodiment is merely concrete examples embodying the present disclosure, and the technical scope of the present disclosure may not be limitedly interpreted. That is, the present disclosure may be embodied in various modes without departing from the scope and main features of the present disclosure.

Although the sound emitted by the sound system 1 is determined as the alert-related sound, for example, in the foregoing embodiment, content of the sound is not limited. As an example, the sound may be a song.

Furthermore, although the control unit 13 and the sound processing device 15 are separately provided in the foregoing embodiment, the sound processing device 15 may be configured to have the functions described as functions of the control unit 13. Moreover, although the in-vehicle device 12 and the control unit 13 are separately provided in the foregoing embodiment, the control unit 13 may have the functions described as the functions of the in-vehicle device 12 or the in-vehicle device 12 may have the functions described as the functions of the control unit 13.

Although a position at which a final sound image may be localized is any of the left side position PL, the right side position PR, the left front position PLF, the right front position PRF, the front position PF, and the back position PB in the foregoing embodiment, the final sound image may be localized at other positions. The same is true for a tentative sound image.

Although the determined position is automatically determined by the in-vehicle device 12 in the foregoing embodiment, the determined position may be manually determined (e.g., by the driver 7).

Moreover, although the headrest speakers 3L and 3R are installed in the headrest portion 6 of the seat 5 in the foregoing embodiment, and the front speakers 2L and 2R are provided correspondingly in the foregoing embodiment, the seat in which headrest speakers 3L and 3R are installed is not limited to the driver's seat, and may be any seat other than the driver's seat in the vehicle cabin 4. However, the front speakers 2L and 2R are required to be installed in appropriate positions on the front side of the head 8 of a listener facing the front side, relative to the positions where the headrest speakers 3L and 3R are installed. The space to which the sound system 1 is employed is not limited to the vehicle cabin 4, but may be, for example, a room in a residence, or a space in some facility.

Figure 10A:
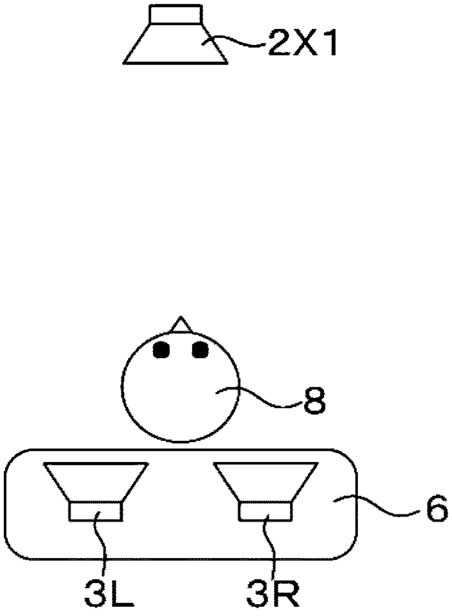
FIGS. 10A and 10B are diagrams illustrating modifications of the sound system.
Figure 10B:
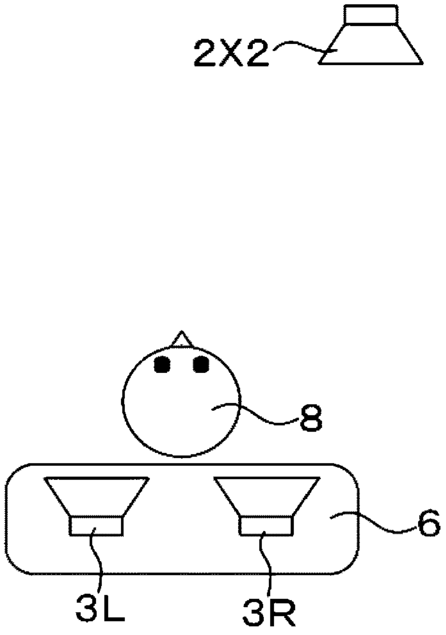

In the foregoing embodiment, the pair of front speakers 2L and 2R are installed on the front side of the head 8. However, a mode the front speakers 2L and 2R is not limited to the mode illustrated in the foregoing embodiment. As an example, as illustrated in FIG. 10A, one front speaker 2X1 may be installed in front of the head 8. In this case, the functions of the first and second processors 17 and 18 allow a final sound image to be localized at a predetermined position between the front speaker 2X1 and the tentative sound image by the headrest speakers 3L and 3R. Furthermore, as an example, as illustrated in FIG. 10B, one front speaker 2X2 may be installed on the right side of the head 8. In this case, the functions of the first and second processors 17 and 18 allow a final sound image to be localized at a predetermined position between the front speaker 2X2 and the tentative sound image by the headrest speakers 3L and 3R.

It is to be understood that the embodiments and the design examples are illustrative only in implementing the present disclosure and should not be construed as limiting the technical scope of the present disclosure. In other words, various changes and modifications of the present disclosure may be made without departing from the spirit and scope thereof.

The invention claimed is:

1. A sound processing device that processes signals to be supplied to a plurality of headrest speakers installed in a headrest portion of a seat and one or more front speakers that are installed in front of a head of a listener when the listener is seated in the seat and facing forward and that emit sound toward the head, the sound processing device comprising:

- a first processor configured to perform a trans-aural process on signals corresponding to the plurality of headrest speakers such that a tentative sound image is localized by the plurality of headrest speakers at a tentative position in a region that does not include a front side relative to the head but includes left and right sides and a back side relative to the head; and
- a second processor configured to perform amplitude panning on signals corresponding to the front speakers and signals processed by the first processor such that a final sound image is localized at a final position between the tentative sound image and the front speakers using the tentative sound image and a difference in volume between the front speakers.

2. The sound processing device according to claim 1, wherein:

- the front speakers are a pair of speakers installed in a front side relative to the head, spaced apart in a lateral direction,
- when the final sound image is localized on a left front side relative to the head, a left front speaker of the pair of front speakers is used, the first processor is configured to perform the trans-aural process such that the tentative sound image is localized at the tentative position on a left side relative to the head, and the second processor is configured to perform amplitude panning such that a final sound image is localized at a final position between the tentative sound image and the front speakers using a difference in volume between the tentative sound image and the left front speaker,
- when the final sound image is localized on a right front side relative to the head, a right front speaker of the pair of front speakers is used, the first processor is configured to perform the trans-aural process such that the tentative sound image is localized at the tentative position on a right side relative to the head, and the second processor is configured to perform amplitude panning such that a final sound image is localized at a final position between the tentative sound image and the front speakers using a difference in volume between the tentative sound image and the right front speaker.

3. The sound processing device according to claim 2, further comprising an adjustment processor configured to perform, in a first stage of a process performed by the first processor, a process of reducing a difference in timing of sound that reaches the head when the individual speakers simultaneously emit the sound, which is caused by a difference between a physical distance from the headrest speakers to the head and a physical distance from the front speakers and the head, and a difference in loudness of the sound that reaches the head when the individual speakers simultaneously emit the sound of the same loudness.

4. The sound processing device according to claim 2, wherein the seat is in a vehicle cabin, and the headrest speakers and the front speakers are installed in the vehicle cabin.

5. The sound processing device according to claim 1, wherein:

- the front speakers are a pair of speakers installed in a front side relative to the head, spaced apart in a lateral direction,
- when the final sound image is localized in front of the head, the pair of front speakers is used, the first processor is configured to perform the trans-aural process such that the tentative sound image is localized at the tentative position on a back side relative to the head, and the second processor is configured to perform the amplitude panning such that a final sound image is localized at the final position between the tentative sound image and the pair of front speakers using a difference in volume between the tentative sound image and the pair of front speakers.

6. The sound processing device according to claim 5, further comprising an adjustment processor configured to perform, in a first stage of a process performed by the first processor, a process of reducing a difference in timing of sound that reaches the head when the individual speakers simultaneously emit the sound, which is caused by a difference between a physical distance from the headrest speakers to the head and a physical distance from the front speakers and the head, and a difference in loudness of the sound that reaches the head when the individual speakers simultaneously emit the sound of the same loudness.

7. The sound processing device according to claim 5, wherein the seat is in a vehicle cabin, and the headrest speakers and the front speakers are installed in the vehicle cabin.

8. A sound system including a plurality of headrest speakers installed in a headrest portion of a seat, one or more front speakers that are installed in front of a head of a listener when the listener is seated in a seat and facing forward and that emit sound toward the head, and a sound processing device that processes signals to be supplied to the headrest speakers and the front speakers, wherein the sound processing device comprises:

a first processor configured to perform a trans-aural process on signals corresponding to the plurality of headrest speakers such that a tentative sound image is localized by the plurality of headrest speakers at a tentative position in a region that does not include a front side relative to the head but includes left and right sides and a back side relative to the head; and a second processor configured to perform amplitude panning on signals corresponding to the front speakers and signals processed by the first processor such that a final sound image is localized at a final position between the tentative sound image and the front speakers using the tentative sound image and a difference in volume between the front speakers.

9. A sound processing method employed in a sound processing device that processes signals to be supplied to a plurality of headrest speakers installed in a headrest portion of a seat and one or more front speakers that are installed in front of a head of a listener when the listener is seated in the seat and facing forward and that emit sound toward the head, the sound processing method comprising:

performing a trans-aural process on signals corresponding to the plurality of headrest speakers such that a tentative sound image is localized by the plurality of headrest speakers at a tentative position in a region that does not include a front side relative to the head but includes left and right sides and a back side relative to the head; and performing amplitude panning on signals corresponding to the front speakers and signals processed by the first processor such that a final sound image is localized at a final position between the tentative sound image and the front speakers using the tentative sound image and a difference in volume between the front speakers.

* * * * *